US009305014B2

(12) United States Patent
Frost et al.

(10) Patent No.: US 9,305,014 B2
(45) Date of Patent: *Apr. 5, 2016

(54) METHOD AND SYSTEM FOR PARALLELIZING DATA COPY IN A DISTRIBUTED FILE SYSTEM

(71) Applicant: VMware, Inc., Palo Alto, CA (US)

(72) Inventors: Christopher Frost, Los Angeles, CA (US); Jinyuan Li, Sunnyvale, CA (US); Mayank Rawat, Sunnyvale, CA (US); Murali Vilayannur, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 14/263,196

(22) Filed: Apr. 28, 2014

(65) Prior Publication Data
US 2014/0236896 A1     Aug. 21, 2014

Related U.S. Application Data

(63) Continuation of application No. 13/111,387, filed on May 19, 2011, now Pat. No. 8,712,960.

(51) Int. Cl.
*G06F 17/30*     (2006.01)

(52) U.S. Cl.
CPC ........ *G06F 17/302* (2013.01); *G06F 17/30194* (2013.01); *G06F 17/30215* (2013.01); *G06F 17/30575* (2013.01)

(58) Field of Classification Search
CPC ............ G06F 17/30194; G06F 17/302; G06F 17/30215; G06F 17/30575
USPC .................................................. 707/634, 636
See application file for complete search history.

(56) References Cited

U.S. PATENT DOCUMENTS

| 6,405,217 | B1 | 6/2002 | Lee |
| 6,742,023 | B1 | 5/2004 | Fanning et al. |
| 7,849,098 | B1 | 12/2010 | Scales et al. |
| 8,712,960 | B2 * | 4/2014 | Frost ................. G06F 17/30194 707/634 |
| 2009/0106355 | A1 | 4/2009 | Harrow et al. |
| 2010/0186014 | A1 | 7/2010 | Vaghani et al. |
| 2012/0110005 | A1 | 5/2012 | Kuo et al. |

OTHER PUBLICATIONS

Final Office Action dated Sep. 13, 2013, U.S. Appl. No. 13/111,387, 14 pages.
Non-Final Office Action dated Feb. 1, 2013, U.S. Appl. No. 13/111,387, 16 pages.

* cited by examiner

*Primary Examiner* — Vincent Boccio
(74) *Attorney, Agent, or Firm* — Patterson & Sheridan LLP

(57) ABSTRACT

Multiple servers sharing a distributed file system are used to perform copies of regions of a source file in parallel from a source storage unit to corresponding temporary files at a destination storage unit. These temporary files are then merged or combined into a single file at the destination storage unit in a way that preserves the inode structure and attributes of the source file. A substantial speedup is obtained by copying regions of the file in parallel.

12 Claims, 9 Drawing Sheets

METHOD AND SYSTEM FOR PARALLELIZING DATA COPY IN A DISTRIBUTED FILE SYSTEM

RELATED APPLICATIONS

This application is a continuation which claims priority from U.S. patent application Ser. No. 13/111,387, filed May 19, 2011, entitled "Method and System for Parallelizing Data Copy in a Distributed File System." issued as U.S. Pat. No. 8,712,690 on Apr. 29, 2014.

BACKGROUND

Copying a file is a fairly common operation on a single server equipped with its own data storage. As the size of a file increases, so too does the time to copy that file. Copying a file involves allocating enough storage on some disk storage device to accommodate all the data in the file being copied and then copying the data itself to the allocated storage on disk. Since allocating all the storage up front for a very large file takes a fair amount of time, many file systems allocate storage on demand as the data is being written to the storage device. The time to copy also increases when the data to be copied is transferred over a network to a different storage device because the transfer time over a network needs to be taken into account. Finally, the task of copying very large files imposes demands on the server's hardware resources such as CPU and memory.

In the world of virtual machines where a number of virtual machines each with its own guest operating system may execute concurrently on a single server, the server's hardware resources such as CPU and memory are apportioned amongst the virtual machines. The server's resources are taxed even more, because copying a typical virtual machine disk image can take hundreds, if not thousands, of seconds. The task of copying such a disk image file places significant additional burden on a single server's hardware resources, including CPU cycles, memory for copy buffers, host bus adaptor queue slots, and network bandwidth.

Even in a cluster of virtual machines running on multiple server systems that share a common file system, the process of copying a file from a source storage device to a destination storage device is a serialized process. For very large files, this serialized procedure is very inefficient.

SUMMARY

In one or more embodiments of the invention, multiple servers sharing a distributed file system are used to perform copies of regions of a source file in parallel from a source storage unit to corresponding temporary files at a destination storage unit. These temporary files are then merged or combined into a single file at the destination storage unit. A substantial speedup is obtained by copying regions of the file in parallel.

A method for parallelizing data copy in a distributed file system using a coordinating server that is connected to one or more other servers, according to an embodiment of the invention, includes the steps of partitioning a source file stored in a source storage into multiple regions including at least first and second regions, creating first and second temporary files at a destination storage, copying the first region of the source file to the first temporary file at the destination storage, directing one of the other servers to copy the second region of the source file to the second temporary file at the destination storage, and merging the temporary files into a single destination file at the destination storage in a way that preserves a file descriptor data structure and attributes of the source file.

A computer system according to an embodiment of the present invention comprises a cluster of servers, one of which is a coordinating server, and a distributed file system for the cluster of servers, the distributed file system including a source storage unit and a destination storage unit. The coordinating server is configured to partition a source file at the source storage unit into multiple regions, create a first temporary file at the destination storage unit, and copy a first region of the source file to the first temporary file, and other servers in the cluster are each configured to create a temporary file at the destination storage unit and copy subsequent regions of the source file to the temporary file so created.

Further embodiments of the present invention include a non-transitory computer readable storage medium containing instructions for carrying out a method for parallelizing data copy in a distributed file system using multiple servers.

DETAILED DESCRIPTION

Figure 1A:
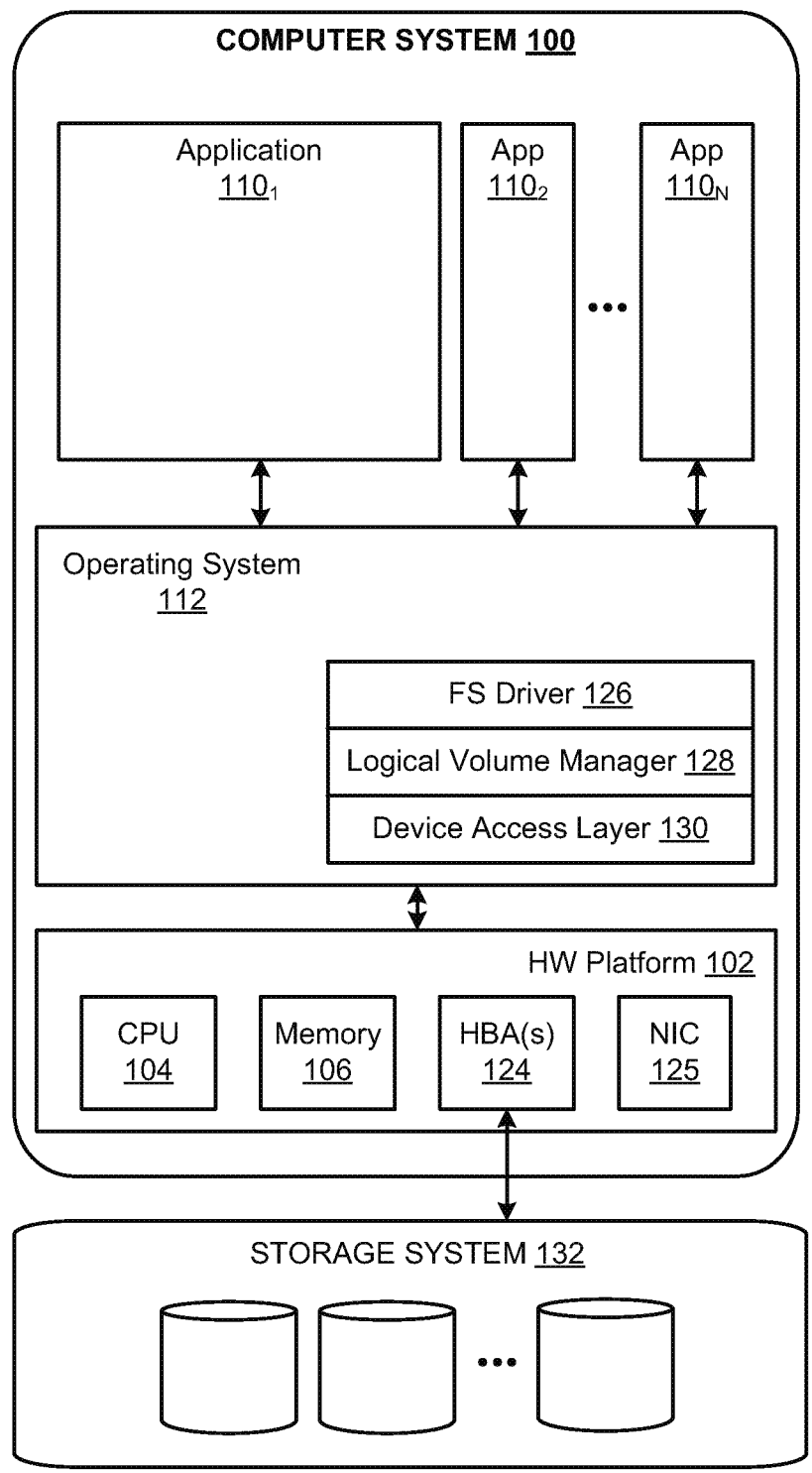
FIG. 1A depicts a functional block diagram of a computer system which may implement one or more embodiments of the present invention.

FIG. 1A depicts a functional block diagram of a computer system which may implement one or more embodiments of the present invention. A computer system 100 may be constructed on a typical desktop or laptop hardware platform 102 such as an x86 architecture platform. Such a hardware platform may include a CPU 104, system memory 106, one or more host bus adapters (HBAs) 124, a network interface card (NIC) 125, and other I/O devices such as mouse and keyboard (not shown in FIG. 1A). An operating system 112 such as Microsoft Windows, Linux or NetWare runs on top of hardware platform 102 and manages hardware resources for applications 110. Persistent data storage for computer system 100 is served by a storage system 132 (e.g., a disk array), which is accessed through HBA 124. A file system driver 126 manages creation, use, and deletion of files stored in storage system 132. Logical volume manager 128 issues raw SCSI operations to device access layer 130 based on the block-level operations issued by file system driver 126. Device access layer 130 discovers storage system 132, and applies command queuing and scheduling policies to the raw SCSI operations.

Figure 1B:
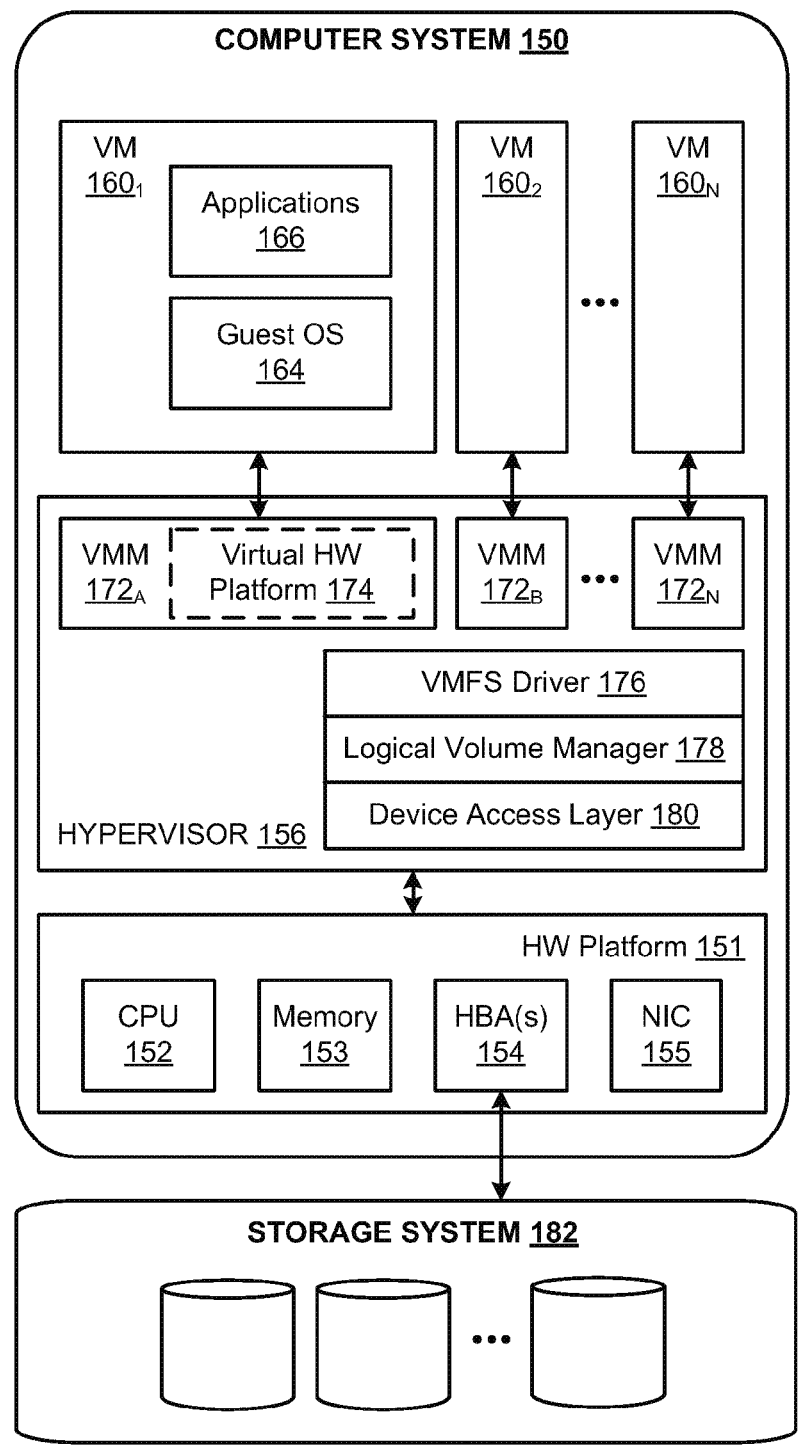
FIG. 1B depicts a functional block diagram of a virtualized computer platform in which one or more embodiments of the present invention may be practiced.

FIG. 1B depicts a functional block diagram of a virtualized computer platform in which one or more embodiments of the present invention may be practiced. Computer system 150 may be constructed on a conventional server-class, hardware platform 151 including host bus adapters (HBAs) 154 in addition to CPU 152, system memory 153, network interface card (NIC) 155, and other standard peripheral components (not separately shown). Hardware platform 151 is coupled to an enterprise-class storage system 182 through HBA 154. Examples of storage systems 182 may be a network attached storage (NAS) device, storage area network (SAN) arrays, or any other similar disk arrays known to those with ordinary skill in the art. It should be recognized that enterprise-level implementations of the foregoing may have multiple computer systems similar to computer system 150 that may be connected through various different known topologies and technologies (e.g., switches, etc.) to multiple storage systems 182.

A virtualization software layer, referred to herein as a hypervisor 156, is installed on top of hardware platform 151 and supports virtual machine execution space within which multiple VMs $160_1$-$160_N$ may be concurrently instantiated and executed. One example of hypervisor 156 that may be used is included as a component of the VMware vSphere® product, which is commercially available from VMware, Inc. of Palo Alto, Calif. Each VM (e.g., VM $160_1$) is an abstraction of a physical computer system having virtual hardware resources and a guest operating system (e.g., guest OS 164) that provides guest applications running in the VM (e.g., applications 166) an interface to the virtual hardware resources. Hypervisor 156 includes a plurality of software layers including a kernel that manages hardware resources of hardware platform 151 through various drivers, and virtual machine monitors (VMMs) each emulating hardware resources for a corresponding one of VMs. In the example illustrated in FIG. 1B, VMM $172_A$ emulates hardware resources and provides a virtual hardware platform 174 for VM $160_1$. In each instance, a VM's guest operating system includes a native file system layer (not shown), for example, either an NTFS or an ext3 type file system layer, that interfaces with one or more virtual disks included in the VM's virtualized hardware platform. File system layers of hypervisor includes a virtual machine file system driver (VMFS driver) 176, a logical volume manager 178, and a device access layer 180. VMFS driver 176 manages creation, use, and deletion of files, such as virtual disks for VMs 160, stored in storage system 182. Permitted guest operating system command and data transfer operations against the virtual disks are translated to block-level operations on files by VMFS driver 176. Logical volume manager 178 issues raw SCSI operations to device access layer 180 based on the block-level operations issued by VMFS driver 176. Device access layer 180 discovers storage system 182, and applies command queuing and scheduling policies to the raw SCSI operations.

Although the inventive concepts disclosed herein have been described with reference to specific implementations, many other variations are possible. For example, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, the tables, record structures and objects may all be implemented in different configurations, redundant, distributed, etc., while still achieving the same results.

Figure 2:
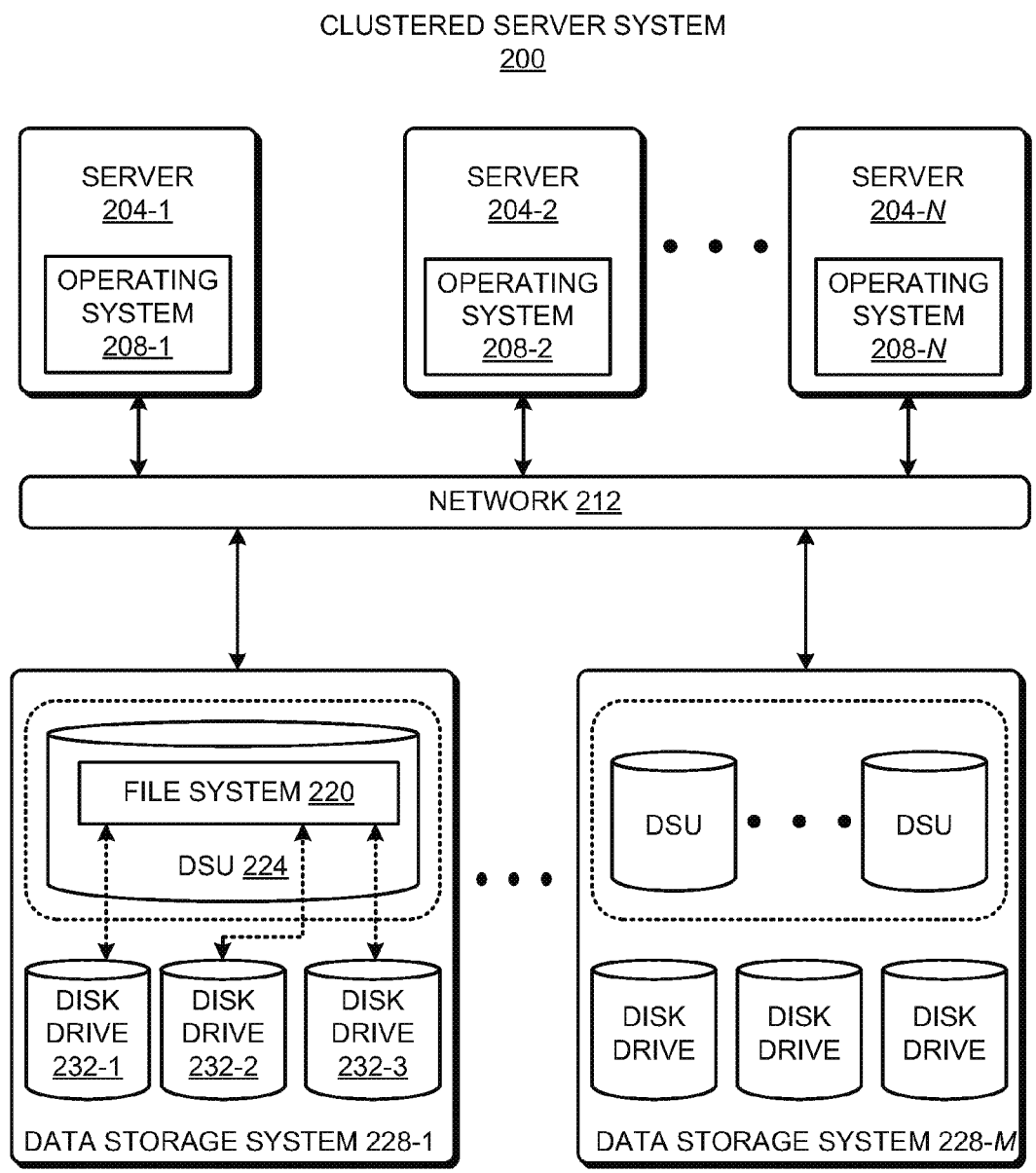
FIG. 2 depicts a computer system configuration utilizing a shared clustered file system.

FIG. 2 illustrates a computer system configuration organized as a clustered server system 200 utilizing a shared clustered file system 220. The computer system configuration of FIG. 2 comprises a cluster of N servers 204-1 to 204-N, each of which is connected to a network 212, and one or more data storage systems 228, which are also connected to network 212. Network 212 may include storage area networks, routers, switches, and junction boxes that enable servers 204 to communicate with each other, with the data storage systems 228, which may be storage arrays, and generally with the external world that is part of network 212.

The shared file system 220 resides on a data storage unit (DSU) 224, which is a logical unit (LUN) of a data storage system 228-1. Shared file system 220 presents to users the abstraction of files and directories organized in a hierarchical fashion. A directory is a special type of file called a directory file that maintains the structure of the file system. A regular file is a linear sequence of bytes and contains the user data; a regular file is typically an ASCII file or a binary file. An application program running in operating system 208-1 manipulates a regular file and only sees the sequence of bytes.

Each file (or directory) is allocated a special data structure on disk, such as an inode, that typically contains metadata about a file such as file attributes and the storage for the user data. The storage for user data is allocated from a disk drive in units called blocks. The shared file system 220 draws its blocks for files and directories from the various disk drives 232 on data storage system 228-1. In some embodiments, a file system may be restricted to obtaining its blocks from the disk drives or disk arrays associated with the same data storage system of which the file system is a part, which implies that file system 220 cannot obtain its blocks from the disk drives associated with other data storage systems like 228-M. In other embodiments, a file system regards the disk drives of all the data storage systems 228 as a pool of blocks irrespective of which data storage systems those blocks are stored on.

In one embodiment, cluster server system 200 includes servers 204 that are each configured like computer system 100, such that each of operating systems 208 is configured as operating system 112. In addition, FS driver 126, logical volume manager 128, and device access layer 130 of computer system 100 constitute the shared file system driver for accessing shared file system 220. In another embodiment, cluster server system 200 includes servers 204 that are each configured like computer system 150, such that each of operating systems 208 is configured as hypervisor 156. In addition, VMFS driver 176, logical volume manager 178, and device access layer 180 of computer system 150 constitute the shared file system driver for accessing shared file system 220.

Figure 3:
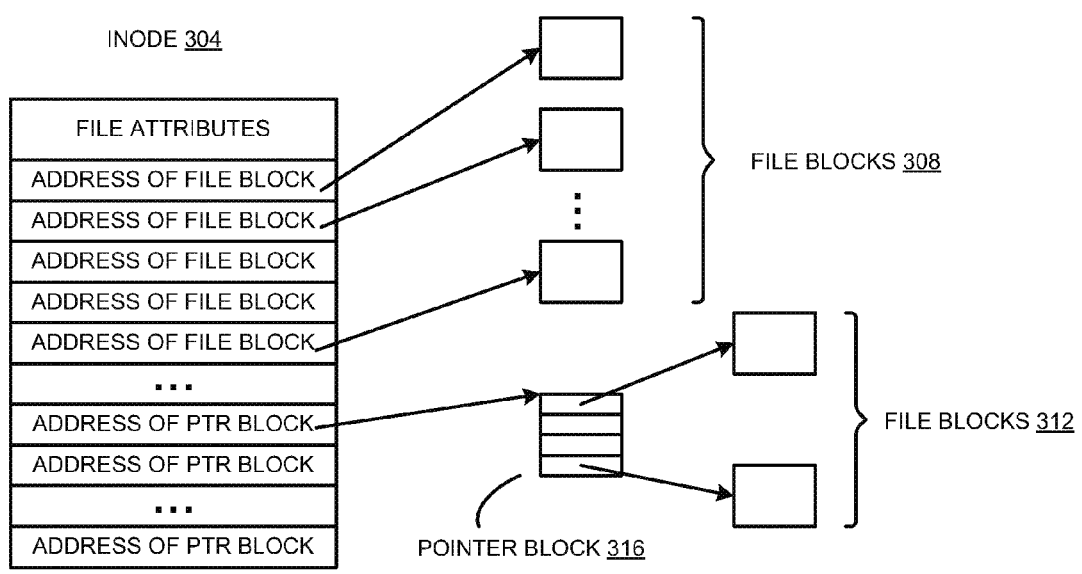
FIG. 3 illustrates a data structure that is used in one or more embodiments of the present invention to keep track of which blocks belong to which files.

FIG. 3 illustrates the inode data structure that is used in one or more embodiments of the present invention to keep track of which blocks belong to which files. Typically, the inode has an on-disk format when on disk and an in-memory format when the file has been opened by an application program for later manipulation. FIG. 3 shows an inode 304 that may contain file attributes (not shown), such as the file mode, modification time, last access time, owner, and addresses of blocks. In some embodiments, an inode may be a fixed size data structure, which could potentially limit the size of files that are supported by the file system. Blocks are the basic unit of information that file systems manipulate. These blocks may reside on the same physical disk drive, the same virtual disk drive, or different drives in the same disk array. The file system hides all these details and presents to the user the appearance of a hierarchically organized collection of files and directories. Blocks are typically of at least two kinds: file blocks and pointer blocks. The file block, also known as the data block, contains the user data, shown in FIG. 3 as file blocks 308; these particular file blocks 308 are pointed to directly by the inode 304. The pointer block 316 contains a sequence of pointer addresses that point to more data blocks not addressable by the inode itself. Thus, the pointer block is a kind of "indirect block," which allows the inode to support files of a larger size. In particular, pointer block 316 contains pointers (addresses) to file blocks 312. In some file systems the inode may include a double indirect block and possibly a triple indirect block to provide even more space for a file.

A file system stores data on the storage device by managing the allocation of each file's blocks within the file system. A file is typically created by allocating an inode on disk and filling in the various file attributes and installing the name of the file in a directory of which the file will be a part. Further, in some embodiments, e.g., file systems for virtualized computer systems that allow virtual disks to be thinly-provisioned, data blocks providing the actual storage may not necessarily be allocated on disk to hold data until the data is actually written to disk; thus, data blocks are allocated on disk on demand. To copy an already existing file to a different location, possibly within the same file system bearing a different name in the same directory or the same name in another directory, the file system creates a different inode on the destination storage device to represent the destination file. While the file system copies the user data from the source file, new blocks will be allocated to hold the data in the destination file. The time it takes for the operating system to copy a file is typically proportional to the size of the file and whether the destination has the capacity to absorb a copy. Thus, a very large file will take proportionally more time than a very small file to copy. Allocating new blocks to a growing file involves potentially updating the inode and various pointer blocks of the file, as well as block bitmaps and other metadata of the file system itself. If a destination file has not been pre-allocated in terms of blocks, then the time to copy a file depends on the speed of allocating blocks on disk together with the speed of copying the user data from the source file to the allocated blocks.

In a distributed system, such as a clustered server system 200 shown in FIG. 2, any server may access any data storage system 228 via network 212. Each data storage system 228 is said to be shared amongst the multiple servers 204. To copy a file between two data storage systems 228, e.g., two different physical storage arrays, the server orchestrating the copy, say server 204-1, ensures first that the destination data storage system 228-2 has enough space for the copy—otherwise the copy process will fail—and second that network 212 has the bandwidth to support a large stream of bytes flowing from the source data storage system to the destination data storage system. Server 204-1 sets the copy process in motion and waits for the process to complete. As noted earlier, copying a very large file puts a tremendous burden on the server's resources, sometimes to the point that the server's performance visibly degrades during the course of the copying. It should be recognized that bandwidth support for most such operations is sufficient and thus the performance degradation is caused primarily by over-burdening of the server's resources.

A better solution would be to leverage the multiple servers in the clustered server system 200 to read from the source file and to write in parallel to the destination file. Thus, the actual amount of work each server does is reduced considerably. Of course, any system has to solve the problem of permitting multiple servers to write to the same file while ensuring that data and metadata remain consistent in the presence of failures; obviously, unprotected and unconstrained writing by multiple servers would be undesirable in that an earlier writer's changes may be overwritten by a later writer's changes.

Figure 4:
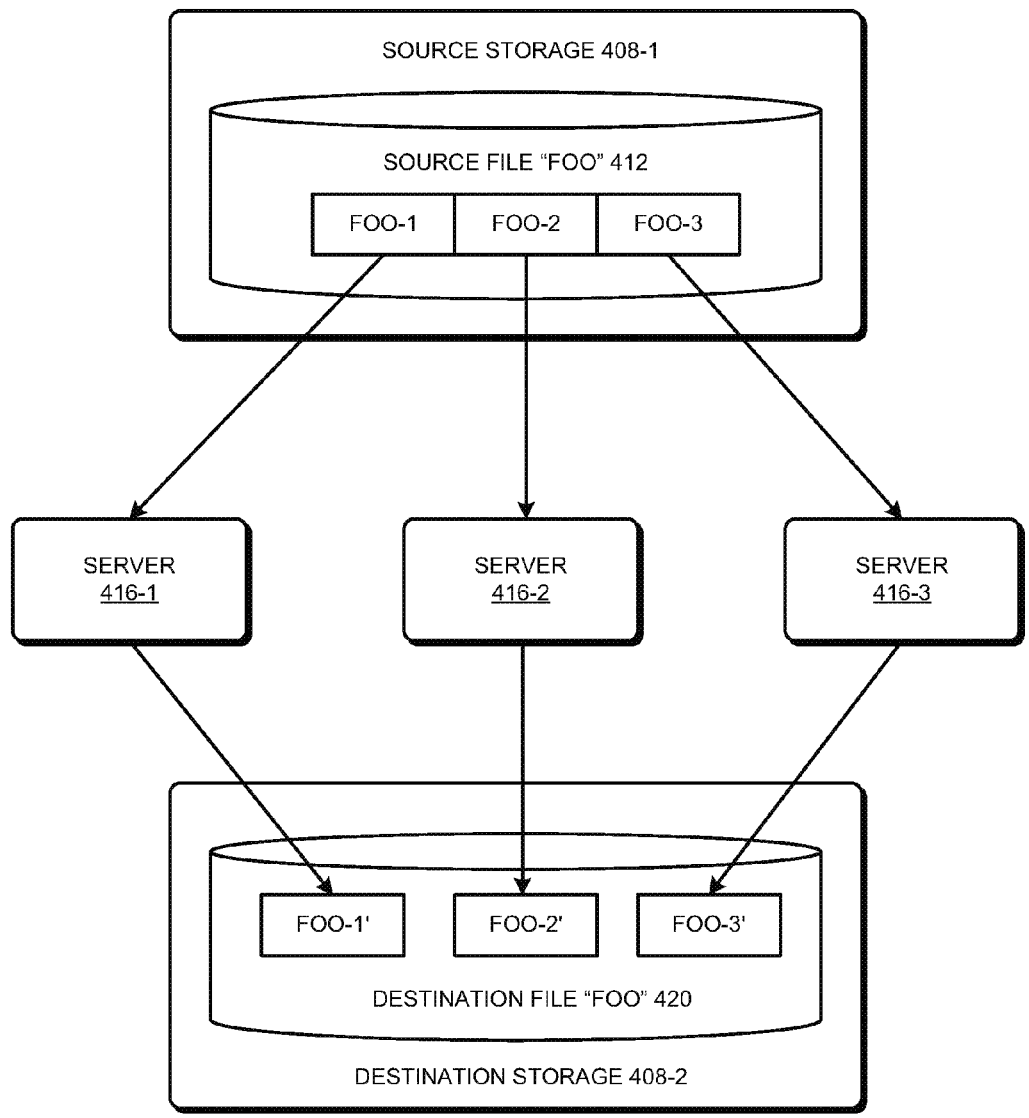
FIG. 4 illustrates how a source file is copied to multiple temporary files on the destination storage system in accordance with one or more embodiments of the present invention.

FIG. 4 illustrates an example of how a source file is copied from source storage 408-1 to multiple temporary files on destination storage 408-2 in accordance with one or more embodiments of the present invention. In this example, three servers will participate in the copy procedure: server 416-1, server 416-2, and server 416-3, one of which is designated as the coordinating server that distributes copying tasks to the other servers. Thus, the source file "foo" 412 is partitioned into three regions, namely foo-1, foo-2, and foo-3, of roughly equal sizes, each region corresponding to a different server. The coordinating server obtains a read lock on source file "foo" 412 to prevent other potentially competing entities from modifying the file. It should be recognized that any lock that prevents modification will suffice and need not be a read lock specifically.

In the embodiment of the present invention described in conjunction with FIG. 4, server 416-1 is the coordinating server that distributes copying tasks to one or more other servers. Server 416-1 creates a temporary file foo-1' at destination storage 408-2. It should be recognized that in some embodiments creating such a file may involve allocating all the blocks at once since the system knows the size of region foo-1 (and the data just needs to be copied) or, in other embodiments (e.g., file systems that support thin provisioning), allocating the blocks on demand as the data is copied. Then server 416-1 copies the data in the region identified as foo-1 to newly created temporary file foo-1'. In parallel to server 416-1 copying, server 416-2 has created a different temporary file foo-2' at destination storage 408-2. It then copies the region identified as foo-2 of the source file "foo" 412 to newly created temporary file foo-2' at destination storage 408-2. Similarly, server 416-3 has created a different temporary file foo-3' at destination storage 408-2. It then copies the region identified as foo-3 of the source file "foo" 412 to newly created temporary file foo-3' at destination storage 408-2. Destination storage 408-2 now contains three temporary files, each corresponding to a region copied from the source file. Upon copy completion, each of servers 416-2, 416-3 employs a standard technique, such as network message exchange or on-disk mailbox, to notify server 416-1 of the copy completion, so that server 416-1 can begin the merge procedure. Ultimately, in the merge procedure to be described later these three temporary files will be "stitched" together efficiently without involving data transfers into one single file, destination file "foo" 420 in the destination storage 408-2.

Figure 5:
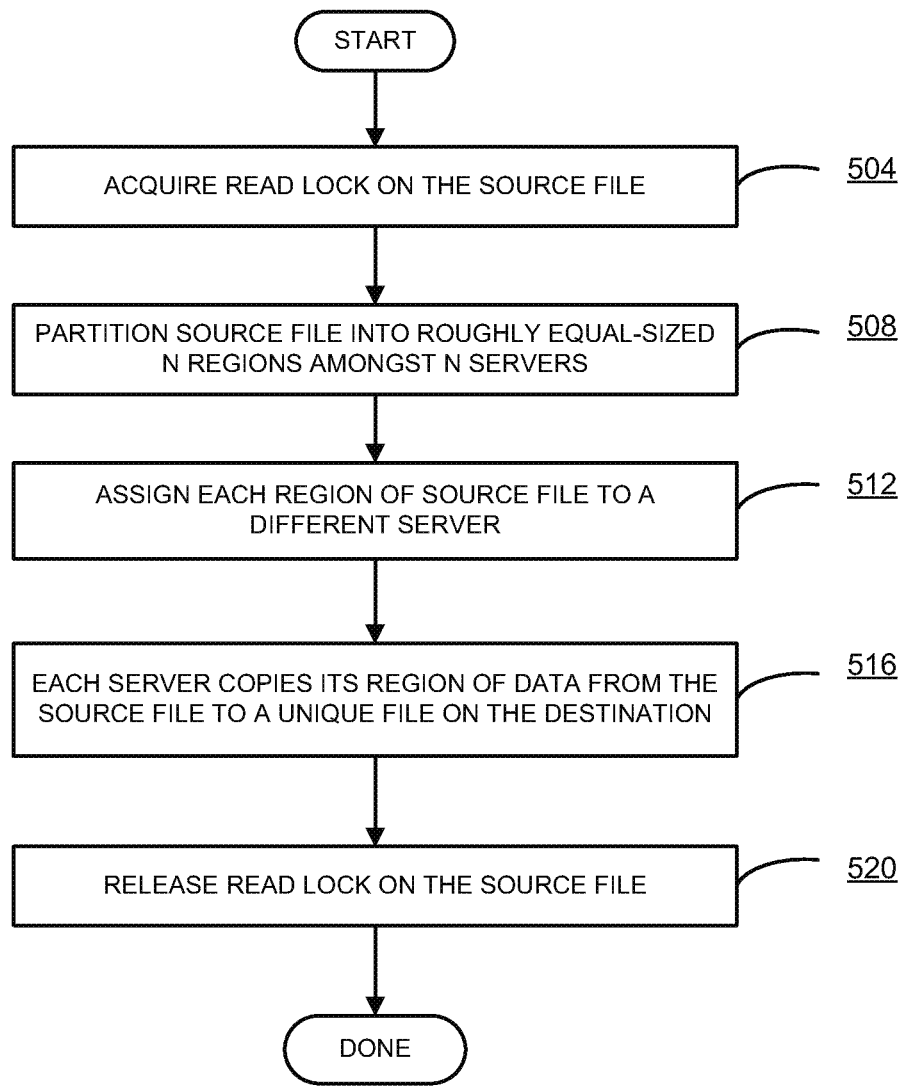
FIG. 5 presents a flowchart that illustrates the process of copying the source file to a destination file employing multiple servers, each copying its own specific non-overlapping region in accordance with one or more embodiments of the present invention.

FIG. 5 presents a flowchart that illustrates the process of copying the source file to a destination storage employing multiple servers, each copying its own specific non-overlapping region in accordance with one or more embodiments of the present invention. It should be recognized that the specific arrangement of steps shown in the figure should not be construed as limiting the scope of the embodiments.

The process begins with the coordinating server acquiring a read lock on the source file to prevent other potentially competing entities from modifying the file as it is being copied (step 504). It should be recognized that a read lock is appropriate at the abstraction of a file, whereas a mutex exclusive lock may be appropriate for the inode representing the file. In any case, what is required is a lock on the source file to prevent any modifications from occurring during the copy.

Next, the coordinating server partitions the source file at the source file server into roughly N equal-sized regions, where N is the number of servers that will be used to perform the copy (step 508). Thus, for example, if three servers can be used to perform the copy in parallel, then the source file will be partitioned into three roughly equal-sized regions. In one embodiment, the servers that will participate in the copying and the server that will function as the coordinating server are selected based on various factors, including current resource (CPU and/or memory) usage, storage connectivity, and storage topology.

Next, the coordinating server assigns each region of the source file to a specific server (step 512).

Next, each specific server is responsible for copying the region assigned to it from the source storage to the destination storage (step 516). The coordinating server creates a new, temporary file at the destination storage corresponding to the copied region from the source file. It should be recognized that in some embodiments all the blocks making up the temporary file are allocated all at once, or in other embodiments the blocks are allocated on demand as data is copied to the temporary file. Each server is permitted to operate independently but in parallel with the other servers.

Finally, upon completion of step 516, the coordinating server releases the read lock on the source file (step 520). At this point, N servers have copied their designated regions of the source file to new, unique temporary files at the destination storage.

Figure 6:
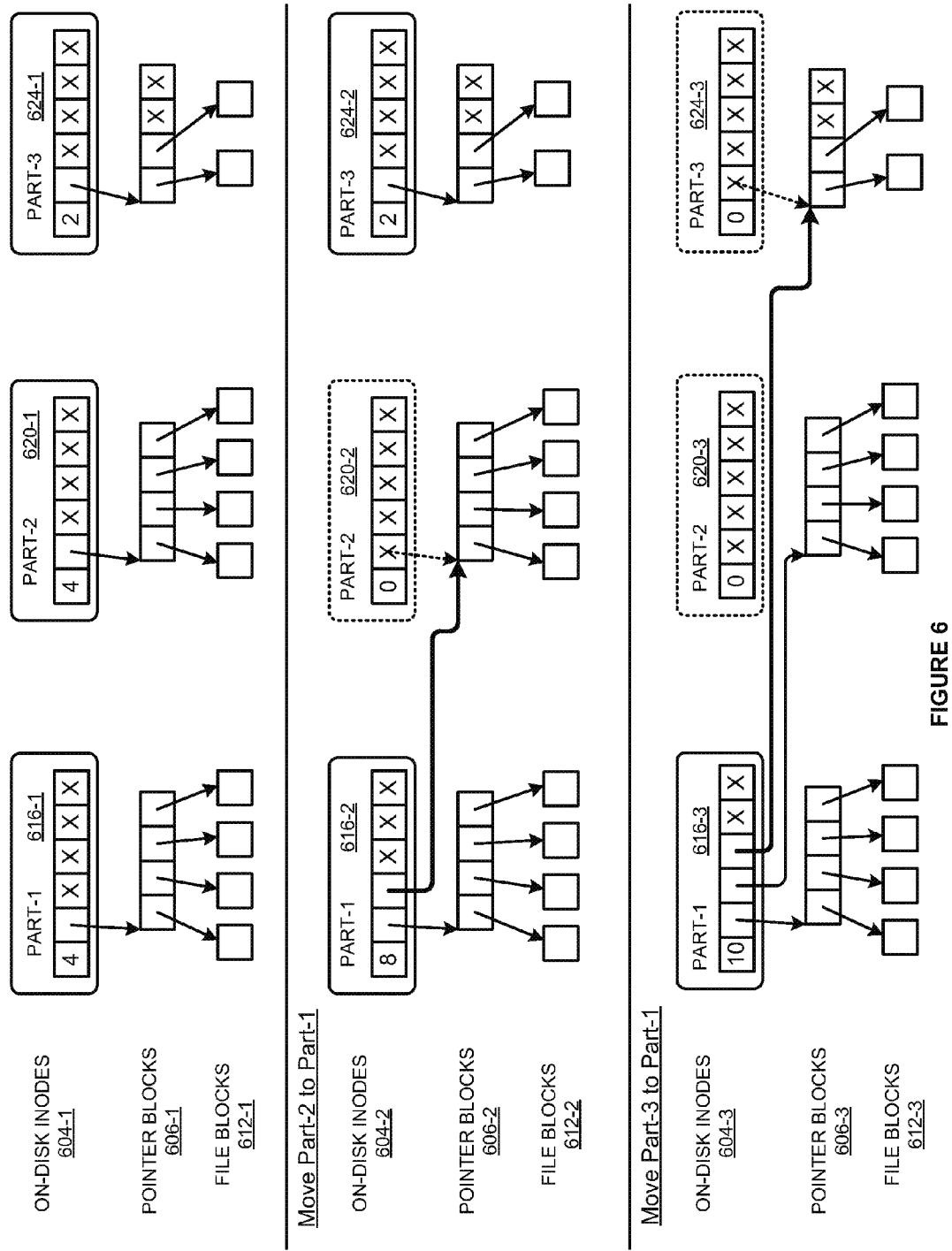
FIG. 6 illustrates an example of the procedure to "stitch" or merge three temporary files at the destination storage into a single file in accordance with one or more embodiments of the present invention.

FIG. 6 illustrates an example of the procedure to "stitch" or merge three temporary files at the destination storage into a single file in accordance with one or more embodiments of the present invention. In one embodiment, the coordinating server is carrying out this procedure upon receiving notification from the other servers that copying has been completed. In particular, FIG. 6 depicts three phases of the merge procedure. At the very top of the figure are on-disk inodes 604-1, followed by pointer blocks 606-1, and then file blocks 612-1. It is assumed for the purposes of this example that the previous copy procedure that partitioned the original source file into three distinct regions produced three temporary files, uniquely named, at the destination. Thus, there are three temporary files, each represented in the file system at the destination as individual inodes: the first file is represented by inode named part-1 616-1, the second file is represented by inode named part-2 620-1, and the third file is represented by inode named part-3 624-1. FIG. 6 does not show other file attributes such as the file mode, owners, modification time and so on as they are not relevant to the ensuing discussion. The inodes depicted in FIG. 6 are a simplification of the inode depicted in FIG. 3 and show just the number of file blocks (which hold data) and the addresses of pointer blocks. It should be recognized that the number of file blocks is an optimization designed to avoid traversing the entire structure just to determine the number of file blocks. Inode part-1 616-1 consists of four file blocks, indicated by the number "4" in the inode part-1 616-1. The inode further contains five pointers (addresses) that may point to pointer blocks. The first pointer points to a pointer blocks 606-1, which consists of pointers to four blocks. The second, third, fourth, and fifth pointers are null, that is, they point to nothing. Each block in pointer blocks 606-1 points to (or addresses) an individual file blocks 612-1. Inode part-2 620-1 happens to be identical to inode part-1 616-1 in structure only and in the number of file blocks (namely four), but will likely differ in the actual data contained in the file blocks 612-1. Finally, inode part-3 624-1 contains just two file blocks. Pointer blocks 606-1 contains just two pointers to two file blocks only.

The intuition behind merging multiple temporary files of the destination is to adjust pointers at the level of the pointer blocks. Adjusting pointers is efficient and involves only modifying the inodes as will be seen in the ensuing discussion. The time complexity of this merge procedure is proportional to the number of temporary files.

From this initial state of three temporary files at the destination, the merge procedure performs pair-wise merging, that is, it merges two inodes at a time. This procedure is depicted in the second phase, that is, move part-2 to part-1, as shown in FIG. 6. The procedure selects inode part-1 616-2 as the anchor of the merge, that is, all subsequent pair-wise merges will occur with respect to this anchor. This makes sense because this inode represents the first region of the source file and the notion of an anchor preserves the ordering of the file blocks. The merge procedure considers inode part-2 620-2. The idea is to take the address of the pointer blocks 606-2 in the second inode part-2 620-2, shown by the arrow, and add this address to the pointer block list of addresses in first, or anchor, inode part-1 616-2. In the second phase, the second entry of the pointer block list in the first inode, which was originally null (and not pointing to anything), now points to the pointer block that originally belonged to the second inode part-2 620-1; this new address is shown by the arrow in bold. Thus, the first inode now has a pointer to the pointer blocks of the second inode. The procedure further updates the number of blocks in the first inode from 4 to 8 since there were four file blocks in both inodes. The merge procedure further changes the number of blocks in the second inode part-2 620-2 to 0. Ultimately, this second inode and thus the temporary file that it represents will be deleted. The second inode has now been merged into the first inode. In one embodiment, the operations described in FIG. 6 are carried out in a manner that ensure crash consistency, e.g., by providing journalling support in file system 220.

In the third phase of the merge procedure, the third inode part-3 624-3 is merged into the modified first inode part-1 616-3, in a fashion similar to previously described. This procedure is depicted in the third phase, that is, move part-3 to part-1 616-3, as shown in FIG. 6. The merge procedure considers inode part-3 624-3. The idea is to take the address of the pointer blocks 606-3 in the third inode part-3 624-3, shown by the arrow, and add this address to the pointer block list of addresses in the first, or anchor, inode part-1 616-3. In this third phase, the third entry of the pointer block list in the first inode, which was originally null (and not pointing to anything), now points to the pointer block of the third inode part-3 624-3; this new address is shown by the arrow in bold emanating from the first inode. Thus, the first inode now has a pointer to the pointer blocks of the third inode, as well as the pointer blocks of the second inode, and of course its own pointer blocks. The procedure further updates the number of blocks in the first inode from 8 to 10 since there were eight file blocks in first inode and two file blocks in the third inode. The merge procedure further changes the number of blocks in the third inode part-3 624-3 to 0. Ultimately, this third inode and, thus the temporary file that it represents, will be deleted.

In one embodiment, the merge operation modifies only the inodes of the temporary files at the destination storage. Modifying only the inodes, and not also the pointer blocks, significantly reduces the amount of data modified and the amount of work devoted to resource allocation and deallocation. In order for the merge operation to modify only the inodes and not also the pointer blocks, each temporary file is configured to have the same inode base structure as the source file being copied. For example, if the region of the source file being copied to a temporary file includes 1000 file blocks that are addressed through 1 pointer block, the inode structure of the temporary file is configured in the same manner, with 1000 file blocks that are addressed through 1 pointer block, even though the temporary file is small enough that it is not necessary to use a pointer block in its inode structure.

Figure 7:
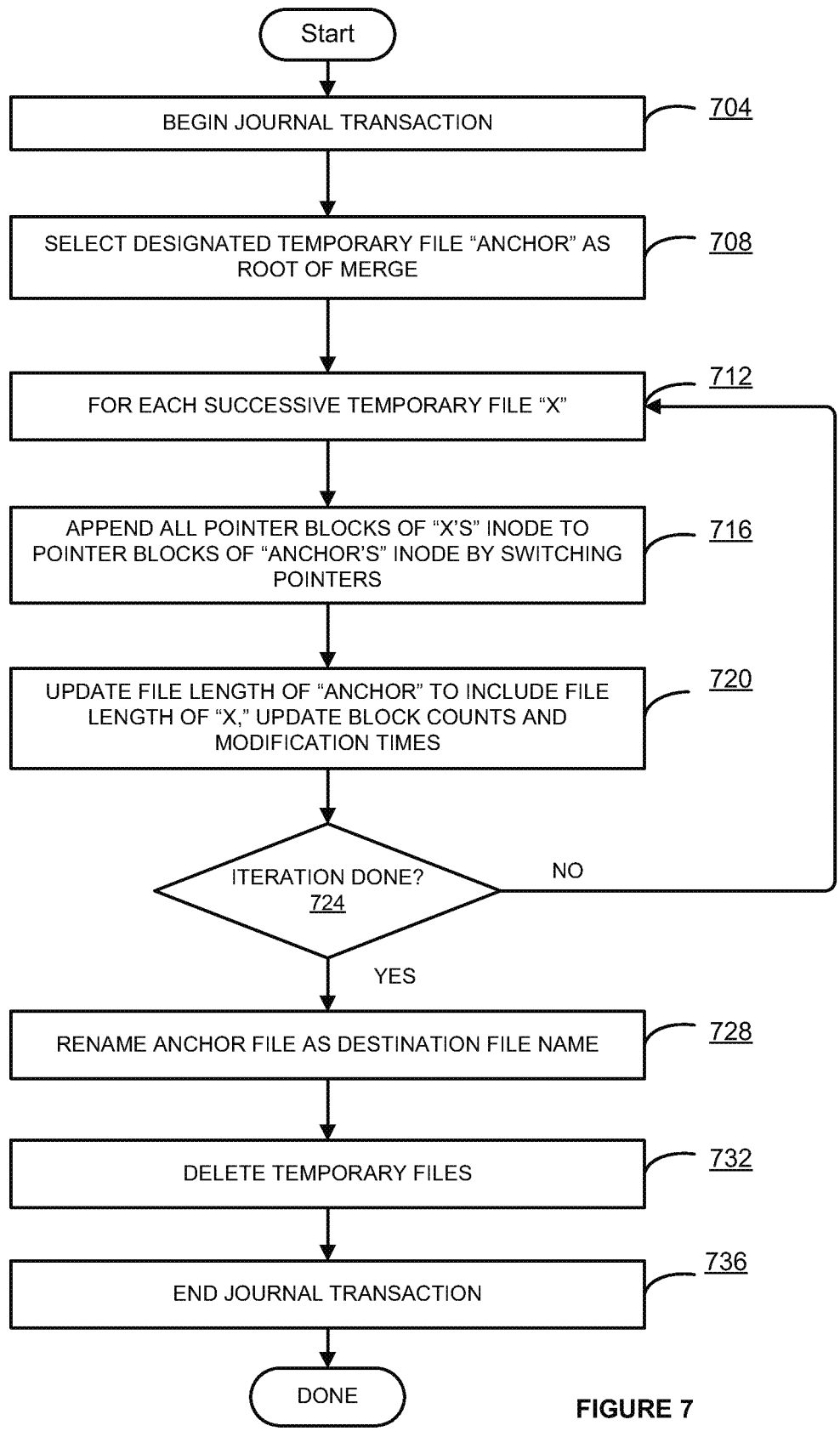
FIG. 7 presents a flowchart that illustrates this merge procedure of merging multiple temporary files at the destination server into a single file in accordance with one or more embodiments of the present invention.

FIG. 7 presents a flowchart that illustrates this merge procedure of merging multiple temporary files at the destination server into a single file in accordance with one or more embodiments of the present invention. It should be recognized that the specific arrangement of steps shown in the figure should not be construed as limiting the scope of the embodiments.

The process begins by starting a journal transaction to ensure consistency of the inode changes in the face of a failure (step 704). This transaction guarantees atomicity, that is, all pointer block addresses moved to the anchor inode will either be committed or aborted; if the changes are committed, then the destination file has been merged successfully from the multiple temporary files and will survive any subsequent failures; if the changes are aborted, then all changes made to all the inodes of the temporary files are rolled back to their original state as if the merge never happened. It should be recognized that without this atomicity guarantee the inodes of the temporary files will be in an incomplete or uncertain state depending on when the failure occurred.

Next, the system selects a designated temporary file as the "anchor" or root of the merge (step 708). Typically, this anchor is the first copied region, which represents the beginning of the source file. Since the merge procedure does pairwise merging of inodes, it needs something to merge into—and the anchor serves this purpose.

Next, the system iterates over all the inodes of the other temporary files, that is, for each successive inode representing a temporary file "X", the system performs steps 712, 716, 720, and 724.

Next, from the inode representing temporary file "X" the system extracts all pointers to pointer blocks in that inode and updates the null or empty pointers in the inode of the anchor temporary file with these extracted pointers (step 716). In effect, the system is switching pointers to pointer blocks from the inode representing temporary file "X" to the inode of the anchor temporary file. The system zeros out the number of file blocks and the extracted pointers in the inode representing temporary file "X." Recall that without the atomicity guarantee, if a crash happened on the destination file server then these temporary files will be in inconsistent states.

Next, the system updates the file length of the anchor temporary file to include the file length of the temporary file "X" that was merged, updates the block counts, modification times, and other file metadata (step 720).

If there are no more temporary files to consider, that is, if the iteration is done (step 724), then the system proceeds to step 728. Otherwise, if there are more temporary files then the system returns to step 712 to continue merging temporary files.

Next, the system renames the anchor file to be the same name as the original source file (step 728).

Next, the system deletes the temporary files from the destination file server (step 732).

Finally, the system ends the journal transaction (step 736) by committing the changes made. At this point the destination file is an exact copy of the original source file.

Figure 8:
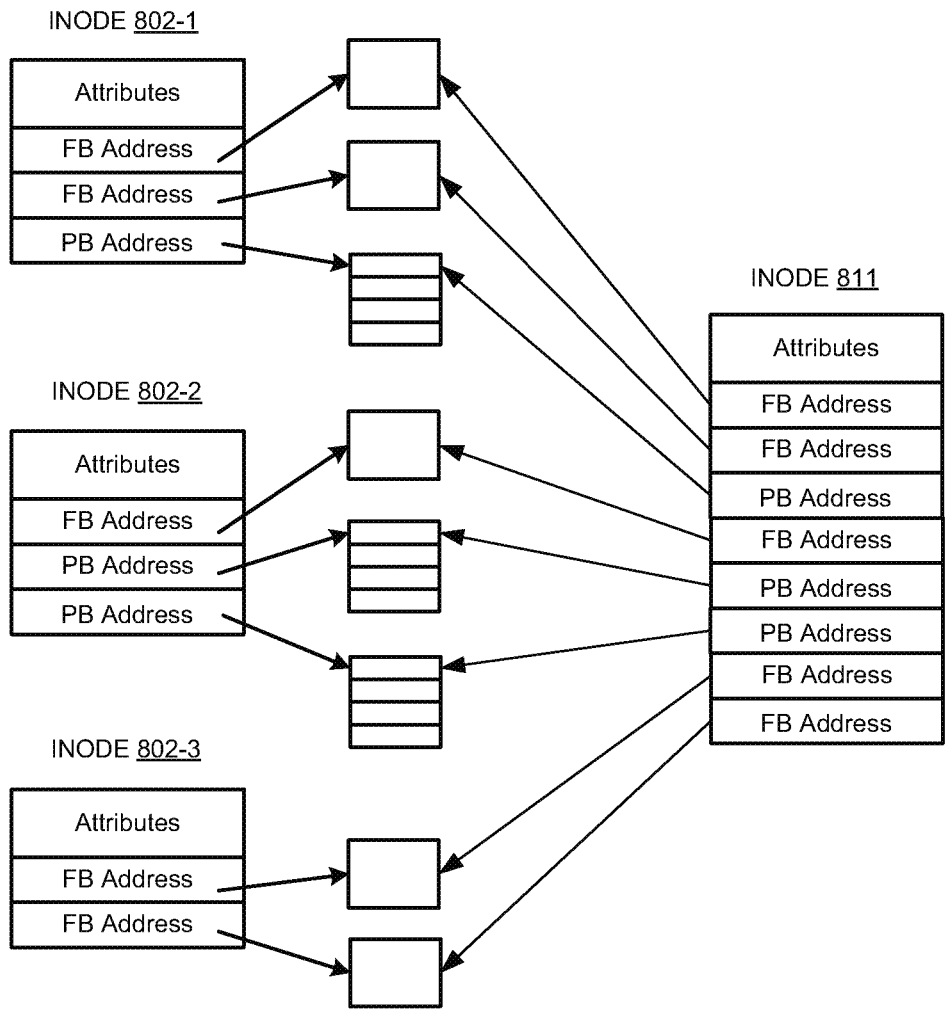
FIG. 8 illustrates another example of the procedure to "stitch" or merge three temporary files at the destination storage into a single file in accordance with one or more embodiments of the present invention.

In file systems that permit block sharing, a merge operation according to an alternative embodiment may be implemented. In this embodiment, after data have been copied to the temporary files, whose inodes are represented in FIG. 8 as inode 802-1, inode 802-2, and inode 802-3, file block addresses and pointer block addresses contained in each of these inodes are copied in order into inode 811 for the destination file. Once the destination file references all the data blocks referenced by inode 802-1, inode 802-2, and inode 802-3, the temporary files are removed, leaving the destination file as the sole owner of these data blocks.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for increasing the speed of data replication by parallelizing data copy using a coordinating server that is connected to one or more other servers, the method comprising:
   partitioning in place a source file stored in a shared clustered file system of the coordinating server and the other servers into multiple regions including at least first and second regions;
   creating first and second temporary files in the shared clustered file system;
   copying the first region of the source file to the first temporary file, wherein the copying of the first region is performed by the coordinating server;
   directing one of the other servers to copy the second region of the source file to the second temporary file, wherein the copying of the first region is performed during a first time period and the copying of the second region is performed during a second time period, and wherein the first time period and the second time period partially overlap; and
   merging the temporary files into a single destination file in the shared clustered file system in a way that preserves a file descriptor data structure and attributes of the source file.

2. The method of claim 1, wherein said merging comprises:
   populating a file descriptor data structure of the destination file with pointers to file blocks and pointer blocks contained in file descriptor data structures of the temporary files.

3. The method of claim 1, wherein said partitioning is carried out so that, after said partitioning, each pointer block contained in a file descriptor data structure of the source file points to file blocks that are contained in one and only one region of the source file created from said partitioning.

4. The method of claim 1, further comprising:
   acquiring a read lock on the source file prior to said partitioning and releasing the read lock after all the servers have copied their respective regions of the source file to the individual temporary files at the destination storage.

5. A non-transitory computer-readable storage medium for storing instructions that, when executed by a coordinating server that is connected to one or more other servers, causes the coordinating server to perform a method for increasing the speed of data replication by parallelizing data copy, the method comprising:
   partitioning in place a source file stored in a shared clustered file system of the coordinating server and the other servers into multiple regions including at least first and second regions;
   creating first and second temporary files in the shared clustered file system;
   copying the first region of the source file to the first temporary file;
   directing one of the other servers to copy the second region of the source file to the second temporary file, wherein the copying of the first region is performed during a first time period and the copying of the second region is performed during a second time period, and wherein the first time period and the second time period partially overlap; and
   merging the temporary files into a single destination file in the shared clustered file system in a way that preserves a file descriptor data structure and attributes of the source file.

6. The non-transitory computer-readable storage medium of claim 5, wherein said merging comprises:
   populating a file descriptor data structure of the destination file with pointers to file blocks and pointer blocks contained in file descriptor data structures of the temporary files.

7. The non-transitory computer-readable storage medium of claim 5, wherein said partitioning is carried out so that, after said partitioning, each pointer block contained in a file descriptor data structure of the source file points to file blocks that are contained in one and only one region of the source file created from said partitioning.

8. The non-transitory computer-readable storage medium of claim 5, wherein the method further comprises:
   acquiring a read lock on the source file prior to said partitioning and releasing the read lock after said copying.

9. A computer system comprising:
   a cluster of servers, wherein each server comprises a CPU and a system memory, and wherein one of the servers is a coordinating server; and
   a shared file system for the cluster of servers,
   wherein the coordinating server is configured to partition in place a source file in the shared file system into multiple regions, create a first temporary file in the shared file system, and copy a first region of the source file to the first temporary file, and
   wherein other servers in the cluster are each configured to create a temporary file in the shared file system and copy subsequent regions of the source file to the temporary file so created, wherein the copying of the first region is performed during a first time period, and wherein the first time period partially overlaps with a second time period during which the copying of one or more of the subsequent regions is performed.

10. The computer system of claim 9, wherein the coordinating server is configured to merge the temporary files into a single destination file.

11. The computer system of claim 9, wherein the coordinating server is configured to populate a file descriptor data structure of the destination file with pointers to file blocks and pointer blocks contained in file descriptor data structures of the temporary files.

12. The computer system of claim 9, wherein the coordinating server is configured to partition so that, after said partitioning, each pointer block contained in a file descriptor data structure of the source file points to file blocks that are contained in one and only one region of the source file created from said partitioning.

\* \* \* \* \*